(12) United States Patent
Terakawa

(10) Patent No.: US 7,742,627 B2
(45) Date of Patent: Jun. 22, 2010

(54) APPARATUS AND PROGRAM FOR DETECTING FACES

(75) Inventor: Kensuke Terakawa, Kanagawa-ken (JP)

(73) Assignee: Fujifilm Corporation (JP)

( * ) Notice: Subject to any disclaimer, the term of this patent is extended or adjusted under 35 U.S.C. 154(b) by 937 days.

(21) Appl. No.: 11/528,381

(22) Filed: Sep. 28, 2006

(65) Prior Publication Data

US 2007/0071329 A1    Mar. 29, 2007

(30) Foreign Application Priority Data

Sep. 28, 2005    (JP)    ............................. 2005/281446

(51) Int. Cl.
    G06K 9/00    (2006.01)
(52) U.S. Cl. ........................ 382/118; 382/103; 382/224
(58) Field of Classification Search ................ 382/103, 382/118
    See application file for complete search history.

(56) References Cited

U.S. PATENT DOCUMENTS 7,155,036 B2* 12/2006 Li ............................... 382/118

7,457,432 B2* 11/2008 Ai et al. ........................ 382/103
2002/0102024 A1    8/2002 Jones et al.
2004/0264744 A1* 12/2004 Zhang et al. ................. 382/118
2005/0094854 A1*  5/2005 Kim ............................ 382/118

OTHER PUBLICATIONS

S. Lao et al., "Fast Omni-Directional Face Detection," MIRU2004, pp. II271-II276, Jul. 2004.
S. Li and Z. Zhang, "FloatBoost Learning and Statistical Face Detection", IEEE Transactions on Pattern Analysis and Machine Intelligence, vol. 26, No. 9, pp. 1-12, Sep. 2004.

* cited by examiner

*Primary Examiner*—Tom Y Lu
(74) *Attorney, Agent, or Firm*—Studebaker & Brackett PC; Donald R. Studebaker

(57) ABSTRACT

Usability of a face detecting apparatus is improved, by enabling selection of a detecting mode optimal for an intended purpose, when detecting facial images from within images. During detection of images of forward facing faces, switching of the detecting mode to one of: a detection rate mode; a false positive detection rate mode; and a processing speed mode is enabled. Face detection focused on optimizing detection performance for each detecting mode is performed.

8 Claims, 5 Drawing Sheets

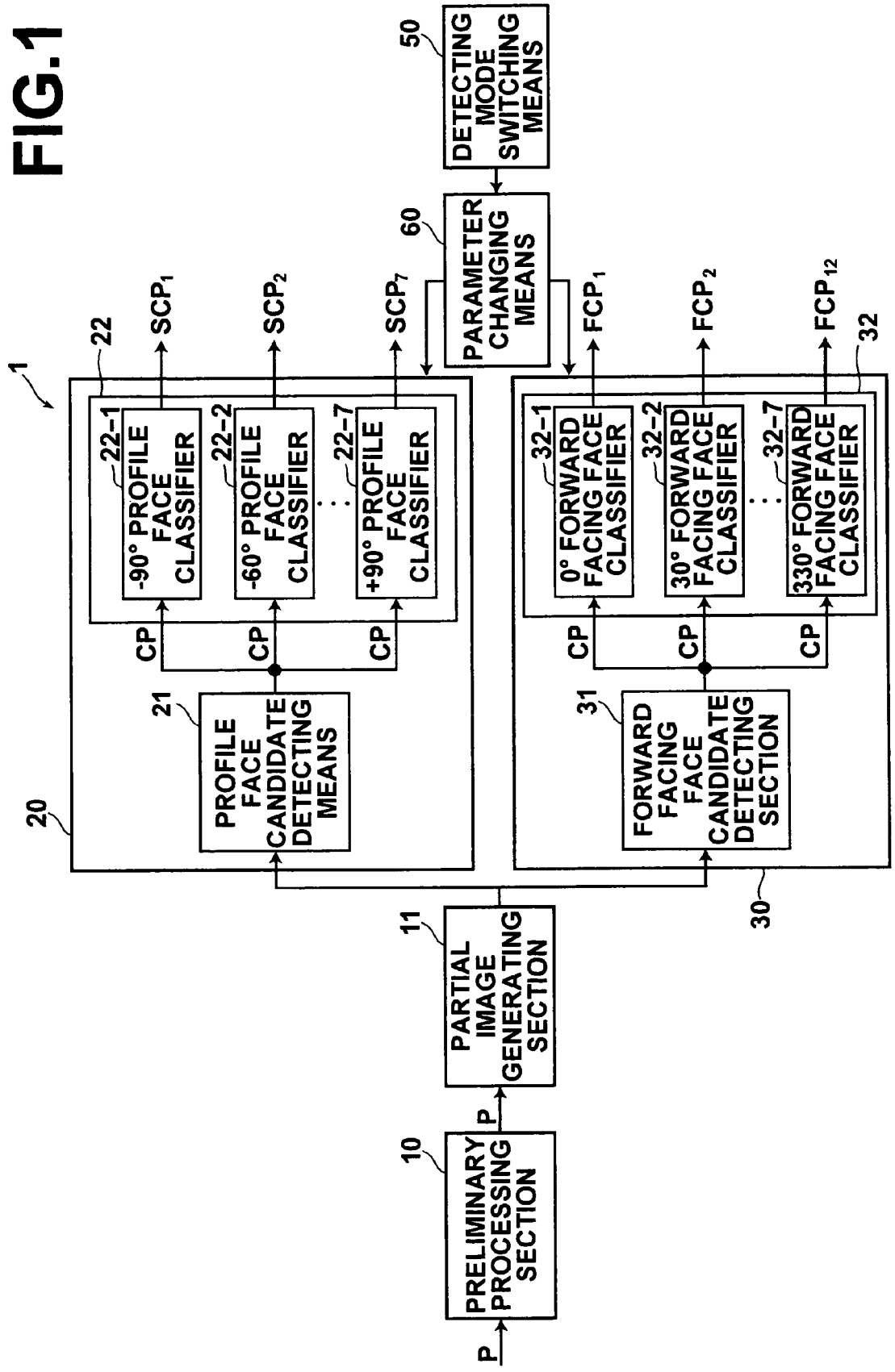

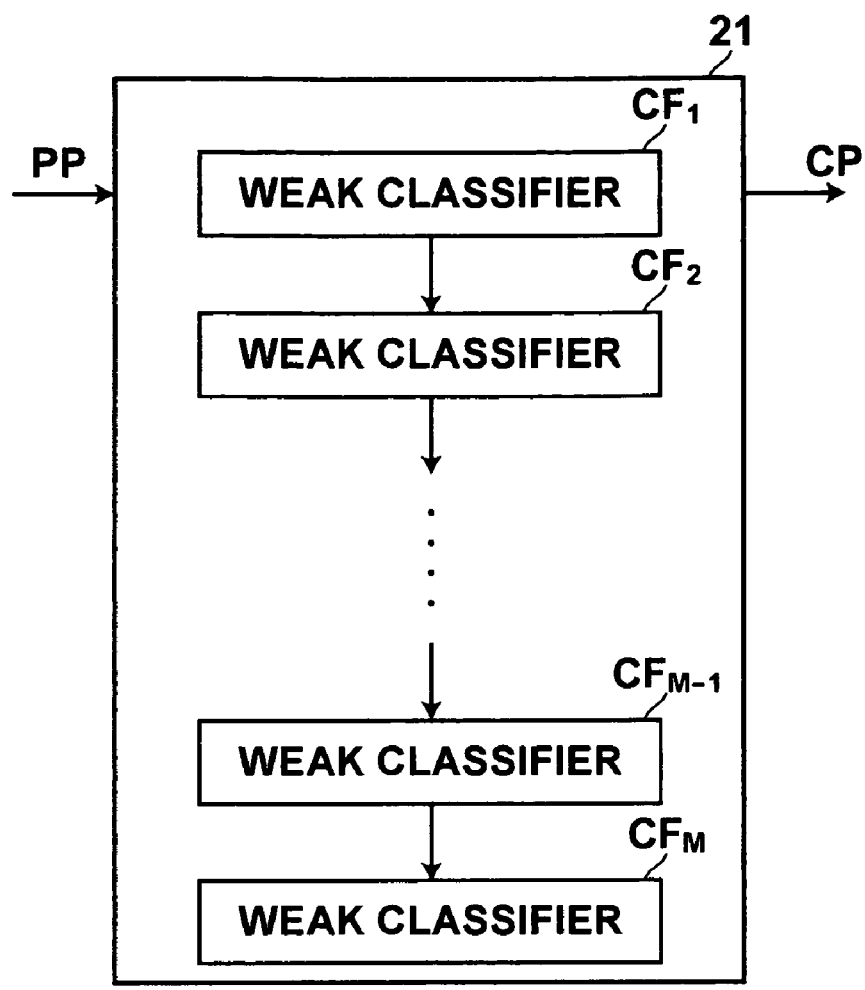

FIG.6

```
START
  ↓                                    ST1
GENERATE AND NORMALIZE
RESOLUTION IMAGES
  ↓                                    ST2
GENERATE PARTIAL IMAGES PP
  ↓                                    ST3
DETECT CANDIDATES WITH
CANDIDATE DETECTING MEANS 21, 31
  ↓                                    ST4
DISCRIMINATE WITH
CLASSIFYING MEANS 22, 32
  ↓
END
```

FIG.7

|  | DETECTION RATE | FALSE POSITIVE DETECTION RATE | PROCESSING SPEED |
|---|---|---|---|
| DETECTION RATE |  | ↑ | ↓ |
| FALSE POSITIVE DETECTION RATE | ↓ |  | ↑ |
| PROCESSING SPEED | ↓ | ↑ |  |

APPARATUS AND PROGRAM FOR DETECTING FACES

BACKGROUND OF THE INVENTION

1. Field of the Invention

The present invention relates to a face detecting apparatus and a face detecting program, for discriminating whether human faces are included in images.

2. Description of the Related Art

The basic principle of face detection, for example, is classification into two classes, either a class of faces or a class not of faces. A technique called "boosting" is commonly used as a classification method for classifying faces. The boosting algorithm is a learning method for classifiers that links a plurality of weak classifiers to form a single strong classifier. Edge data within the planes of multiple resolution images are employed as characteristic amounts used for classification by the weak classifiers.

U.S. Patent Application Publication No. 20020102024, S. Lao et al., "Fast Omni-Directional Face Detection", MIRU2004, pp. II271-II276, July 2004, and S. Li and Z. Zhang, "Float Boost Learning and Statistical Face Detection", IEEE Transactions on Pattern Analysis and Machine Intelligence, Vol. 26, No. 9, pp. 1-12, September 2004 disclose methods that speeds up face detecting processes by the boosting technique. In these methods, the weak classifiers are provided in a cascade structure, and only images which have been judged to represent faces by upstream weak classifiers are subject to judgment by downstream weak classifiers.

A detection rate, a false positive detection rate, and processing speed are three criteria when evaluating the detection performance of the aforementioned classifiers. In order to improve the detection performance of classifiers, it is desired for the detection rate to be increased, the false positive detection rate to be decreased, and the processing speed to be increased. Here, the "detection rate" refers to the percentage of correct discriminations regarding whether an image represents a face. The "false positive detection rate" refers to a percentage of erroneous detections, when images that do not represent faces are detected as faces. The "processing speed" refers to the speed at which discrimination is performed after an image is input. These three evaluative criteria are correlated. If the detection rate is increased, the false positive detection rate increases, and the processing speed decreases. If the false positive detection rate is decreased, the detection rate decreases, and the processing speed increases. If the processing speed is increased, the detection rate decreases, and the false positive detection rate decreases.

Meanwhile, face detecting processes are performed for a variety of purposes, such as skin color correction and red eye correction. Different detection performances are desired for each purpose. Accordingly, there is a problem that a face detecting apparatus having a detection performance suited for general use cannot perform optimal face detection suited for each purpose.

SUMMARY OF THE INVENTION

The present invention has been developed in view of the foregoing problem. The object of the present invention is to provide a face detecting apparatus and a face detecting program that enables selection of optimal detecting modes for the intended purposes of face detecting processes.

A face detecting apparatus of the present invention comprises:

partial image generating means for scanning a subwindow, which is a frame that surrounds a set number of pixels, over the entirety of an image to generate a plurality of partial images;

forward facing face detecting means for detecting partial images that include forward facing faces from among the plurality of partial images generated by the partial image generating means;

profile face detecting means for detecting partial images that include faces in profile from among the plurality of partial images;

detecting mode switching means for switching the detecting mode of the profile face detecting means to one of: a detection rate mode, in which the detection rate is increased; a false positive detection rate mode, in which the false positive detection rate is decreased; and a processing speed mode, in which the processing speed is increased; and parameter changing means, for changing profile face detecting parameters that determine the detection performance of the profile face detecting means according to each of the detecting modes, and for changing forward facing face detecting parameters that determine the detection performance of the forward facing face detecting means.

A face detecting program of the present invention is a program that causes a computer to function as:

partial image generating means for scanning a subwindow, which is a frame that surrounds a set number of pixels, over the entirety of an image to generate a plurality of partial images;

forward facing face detecting means for detecting partial images that include forward facing faces from among the plurality of partial images generated by the partial image generating means;

profile face detecting means for detecting partial images that include faces in profile from among the plurality of partial images;

detecting mode switching means for switching the detecting mode of the profile face detecting means to one of: a detection rate mode, in which the detection rate is increased; a false positive detection rate mode, in which the false positive detection rate is decreased; and a processing speed mode, in which the processing speed is increased; and parameter changing means, for changing profile face detecting parameters that determine the detection performance of the profile face detecting means according to each of the detecting modes, and for changing forward facing face detecting parameters that determine the detection performance of the forward facing face detecting means.

Here, the "detection rate" refers to the percentage of correct discriminations regarding whether the partial images represent faces. The "false positive detection rate" refers to a percentage of erroneous detections, when partial images that do not represent faces are detected as faces. The "processing speed" refers to the speed at which discrimination is performed after partial images are input.

The program of the present invention may be provided being recorded on a computer readable medium. Those who are skilled in the art would know that computer readable media are not limited to any specific type of device, and include, but are not limited to: floppy disks; CD's; RAM's; ROM's; hard disks; magnetic tapes; and Internet downloads, in which computer instructions can be stored and/or transmitted. Transmission of the computer instructions through a network or through wireless transmission means is also within the scope of the present invention. Additionally, the computer instructions include, but are not limited to: source;

object; and executable code, and can be in any language, including higher level languages, assembly language, and machine language.

Note that the profile face detecting means may comprise profile face classifiers that employ a plurality of discrimination results obtained by a plurality of weak classifiers to perform final discrimination regarding whether the partial images represent faces in profile. Similarly, the forward facing face detecting means may comprise forward facing face classifiers that employ a plurality of discrimination results obtained by a plurality of weak classifiers to perform final discrimination regarding whether the partial images represent forward facing faces. In this case, the profile face detecting parameters and the forward facing face detecting parameters are threshold values for discrimination scores of the plurality of weak classifiers of the profile face classifiers and the forward facing face classifiers when they discriminate whether the partial images represent faces in profile and forward facing faces, and the parameter changing means changes the threshold values for the discrimination scores according to each of the detecting modes.

Further, the profile face detecting means may comprise profile face candidate classifiers that employ a plurality of discrimination results obtained by a plurality of weak classifiers to perform final discrimination regarding whether the partial images represent faces in profile, and output partial images that possibly represent faces in profile to the profile face classifiers. Similarly, the forward facing face detecting means may comprise forward facing face candidate classifiers that employ a plurality of discrimination results obtained by a plurality of weak classifiers to perform final discrimination regarding whether the partial images represent forward facing faces, and output partial images that possibly represent forward facing faces to the forward facing face classifiers. In this case, the profile face detecting parameters and the forward facing face detecting parameters are threshold values for discrimination scores of the plurality of weak classifiers of the profile face candidate classifiers and the forward facing face candidate classifiers when they discriminate whether the partial images represent faces in profile and forward facing faces, and the parameter changing means changes the threshold values for the discrimination scores according to each of the detecting modes. That is, the parameter changing means may function to change the parameters of the classifiers and/or the candidate classifiers.

The plurality of weak classifiers may be configured in any manner. For example, the plurality of weak classifiers may be arranged in a cascade structure. In this case, judgment is performed by downstream weak classifiers on partial images, which have been judged to represent faces in profile by an upstream weak classifier.

The parameter changing means may: change the profile face detecting parameters such that the detection rates of the profile face detecting means and the forward facing face detecting means become substantially equal when the detecting mode is switched to the detection rate mode; change the profile face detecting parameters such that the false positive detection rates of the profile face detecting means and the forward facing face detecting means become substantially equal when the detecting mode is switched to the false positive detection rate mode; and change the profile face detecting parameters such that the processing speeds of the profile face detecting means and the forward facing face detecting means become substantially equal when the detecting mode is switched to the processing speed mode.

According to the present invention, the face detecting apparatus and the face detecting program comprise: the partial image generating means for scanning a subwindow, which is a frame that surrounds a set number of pixels, over the entirety of an image to generate a plurality of partial images; the forward facing face detecting means for detecting partial images that include forward facing faces from among the plurality of partial images generated by the partial image generating means; the profile face detecting means for detecting partial images that include faces in profile from among the plurality of partial images; the detecting mode switching means for switching the detecting mode of the profile face detecting means to one of: a detection rate mode, in which the detection rate is increased; a false positive detection rate mode, in which the false positive detection rate is decreased; and a processing speed mode, in which the processing speed is increased; and the parameter changing means, for changing profile face detecting parameters that determine the detection performance of the profile face detecting means according to each of the detecting modes, and for changing forward facing face detecting parameters that determine the detection performance of the forward facing face detecting means. Therefore, detection performance can be improved in a cohesive, well balanced manner according to the purpose of face detection processes to be administered.

Note that the profile face detecting means may comprise profile face classifiers that employ a plurality of discrimination results obtained by a plurality of weak classifiers to perform final discrimination regarding whether the partial images represent faces in profile. Similarly, the forward facing face detecting means may comprise forward facing face classifiers that employ a plurality of discrimination results obtained by a plurality of weak classifiers to perform final discrimination regarding whether the partial images represent forward facing faces. If this configuration is adopted, the profile face detecting parameters and the forward facing face detecting parameters are threshold values for discrimination scores of the plurality of weak classifiers of the profile face classifiers and the forward facing face classifiers when they discriminate whether the partial images represent faces in profile and forward facing faces, and the parameter changing means changes the threshold values for the discrimination scores according to each of the detecting modes. In this case, switching among the detection modes would be facilitated.

Further, the profile face detecting means may comprise profile face candidate classifiers that employ a plurality of discrimination results obtained by a plurality of weak classifiers to perform final discrimination regarding whether the partial images represent faces in profile, and output partial images that possibly represent faces in profile to the profile face classifiers. Similarly, the forward facing face detecting means may comprise forward facing face candidate classifiers that employ a plurality of discrimination results obtained by a plurality of weak classifiers to perform final discrimination regarding whether the partial images represent forward facing faces, and output partial images that possibly represent forward facing faces to the forward facing face classifiers. If this configuration is adopted, the profile face detecting parameters and the forward facing face detecting parameters are threshold values for discrimination scores of the plurality of weak classifiers of the profile face candidate classifiers and the forward facing face candidate classifiers when they discriminate whether the partial images represent faces in profile and forward facing faces, and the parameter changing means changes the threshold values for the discrimination scores according to each of the detecting modes. In this case, partial images that clearly do not represent faces in profile or forward facing faces, such as backgrounds and bodies, can be discriminated not to represent faces by the profile face candidate classifiers or the forward facing face candidate classifiers. Thereby, discrimination by the profile face classifiers or the forward facing face classifiers is obviated. Accordingly, detecting operations can be expedited and processing time can be greatly reduced. At the same time, because the parameters of either or both the candidate classifiers and the classifiers can be changed, parameter settings can be finely adjusted according to the purpose of face detecting processes.

The plurality of weak classifiers may be arranged in a cascade structure. If this configuration is adopted, judgment is performed by downstream weak classifiers on partial images, which have been judged to represent faces in profile by an upstream weak classifier. In this case, the amount of processing to be performed by the downstream weak classifiers can be greatly reduced, thereby expediting discrimination processes.

Further, the parameter changing means may: change the profile face detecting parameters such that the detection rates of the profile face detecting means and the forward facing face detecting means become substantially equal when the detecting mode is switched to the detection rate mode; change the profile face detecting parameters such that the false positive detection rates of the profile face detecting means and the forward facing face detecting means become substantially equal when the detecting mode is switched to the false positive detection rate mode; and change the profile face detecting parameters such that the processing speeds of the profile face detecting means and the forward facing face detecting means become substantially equal when the detecting mode is switched to the processing speed mode. The forward facing face detecting means is superior to the profile face detecting means from the viewpoints of detection rates, false positive detection rates, and processing speed. Therefore, by setting the parameters of the profile face detecting means to perform detection processes at the same high performance level of the forward facing face detecting means according to the desired detection performance criteria, high detection performance can be provided as a whole.

BRIEF DESCRIPTION OF THE DRAWINGS

FIG. 1 is a block diagram that illustrates the configuration of a face detecting apparatus according to the preferred embodiment of the present invention.

FIG. 3 is a block diagram that illustrates an example of a candidate classifier of a profile face candidate detecting means illustrated in FIG. 1.

FIG. 6 is a flow chart that illustrates the operation of the face detecting apparatus of FIG. 1.

FIG. 7 is a diagram that illustrates the correlative relationships among each aspect of detection performance of a profile face detecting means.

BEST MODE FOR CARRYING OUT THE INVENTION

Figure 2A:
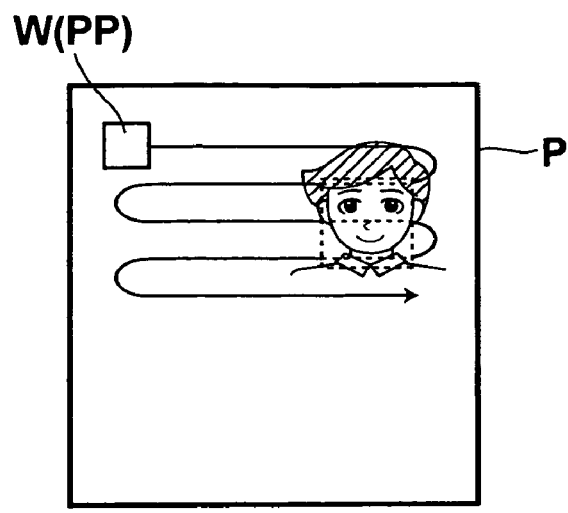
FIGS. 2A, 2B, 2C, and 2D are diagrams that illustrate the manner in which subwindows are scanned by a partial image generating means illustrated in FIG. 1.

Hereinafter, a face detecting apparatus according to a preferred embodiment of the present invention will be described with reference to the attached drawings. FIG. 1 is a block diagram that illustrates the configuration of a face detecting apparatus 1 according to the preferred embodiment of the present invention. Note that the configuration of the face detecting apparatus 1 is realized by executing an object recognition program, which is read into an auxiliary memory device, on a computer (a personal computer, for example). The object recognition program is recorded in a data medium such as a CD-ROM, or distributed via a network such as the Internet, and installed in the computer.

The face detecting apparatus 1 of FIG. 1 discriminates faces. The face detecting apparatus 1 comprises: a preliminary processing means 10; a partial image generating means 11, for generating a plurality of partial images PP by scanning a subwindow W across an entire image P; a profile face detecting means 20, for detecting partial images that represent faces in profile from among the plurality of generated partial images PP; a forward facing face detecting means 30, for detecting partial images that represent forward facing faces from among the plurality of generated partial images PP; a detecting mode switching means 50; and a parameter changing means 60.

Here, preliminary processes are administered on the entire image P by the preliminary processing means 10 prior to being input to the partial image generating means 11. The preliminary processing means 10 functions to generate a plurality of entire images P2, P3, and P4 of different resolutions from the entire image P, as illustrated in FIGS. 2A through 2D. Further, the preliminary processing means 10 functions to administer normalizing processes within local regions (hereinafter, referred to as "local region normalizing processes") of the plurality of entire images P, P2, P3, and P4 so as to suppress fluctuations in contrast thereat.

As illustrated in FIG. 2A, the partial image generating means 11 scans the subwindow W having a set number of pixels (32 pixels by 32 pixels, for example) within the entire image P, and cuts out regions surrounded by the subwindow W to generate the partial images PP having a set number of pixels. The partial image generating means 11 is configured to generate the partial images PP by scanning the subwindow W with intervals of a predetermined number of pixels.

Figure 2B:
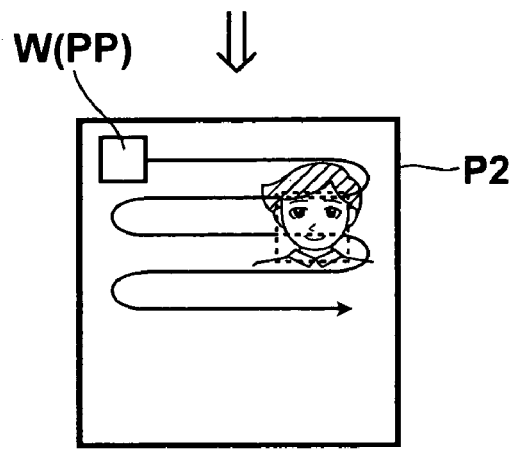
Figure 2C:
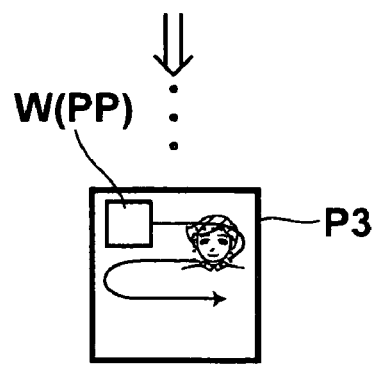
Figure 2D:
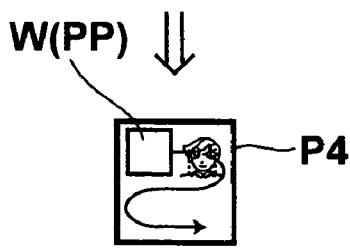

Note that the partial image generating means 11 also generates partial images PP by scanning the subwindow W within the generated lower resolution images P2, P3, and P4 as well, as illustrated in FIGS. 2B through 2D. Thereby, even in the case that a face (discrimination target) pictured in the entire image P does not fit within the subwindow W, it becomes possible to fit the face within the subwindow W in a lower resolution image. Accordingly, faces can be positively detected.

The profile face detecting means 20 detects partial images that represent faces in profile from among the plurality of partial images PP. The profile face detecting means 20 comprises a profile face candidate classifying means 21, and a profile face classifying means 22. The profile face candidate classifying means 21 discriminates whether each of the plurality of partial images PP represent faces in profile, and outputs partial images PP that possibly represent faces in profile to the profile face classifying means 22, as candidate images CP. The profile face classifying means 22 discriminates whether each of the candidate images CP detected by the profile face candidate classifying means 21 and output thereto represent faces in profile.

The profile face candidate classifying means 21 functions to perform binary discrimination regarding whether the partial images PP represent faces in profile, and comprises a plurality of classifiers, each constituted by weak classifiers $CF_1$ through $CF_M$ (M is the number of weak classifiers), as illustrated in FIG. 3. The profile face candidate classifying means 21 is that which has performed learning by the AdaBoosting algorithm, and comprises the plurality of weak classifiers $CF_1$ through $CF_M$. Each of the weak classifiers $CF_1$ through $CF_M$ extracts characteristic amounts x from the partial images PP, and discriminates whether the partial images PP represent faces employing the characteristic amounts x. The profile face candidate classifying means 21 performs final judgment regarding whether the partial images PP represent faces, employing the discrimination results of the weak classifiers $CF_1$ through $CF_M$.

Figure 4:
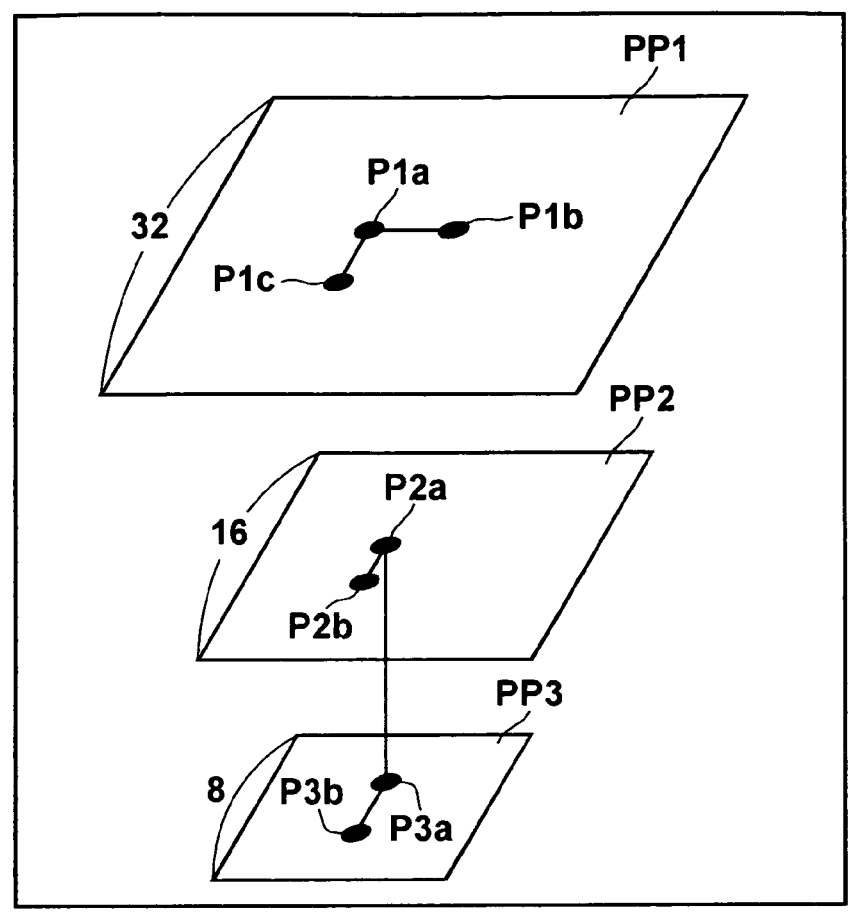
FIG. 4 is a diagram that illustrates the manner in which weak classifiers illustrated in FIG. 1 extract characteristic amounts from partial images.

Specifically, each of the weak classifiers $CF_1$ through $CF_M$ extract extracts brightness values or the like of coordinate positions P1a, P1b, and P1c within the partial images PP, as illustrated in FIG. 4. Further, brightness values or the like of coordinate positions P2a, P2b, P3a, and P3b are extracted from lower resolution images PP2 and PP3 of the partial images PP, respectively. Thereafter, the seven coordinate positions P1a through P3b are combined as pairs, and the differences in brightness values or the like of each of the pairs are designated to be the characteristic amounts x. Each of the weak classifiers $CF_1$ through $CF_M$ employs different characteristic amounts. For example, the weak classifier $CF_1$ employs the difference in brightness values between coordinate positions P1a and P1c as the characteristic amount x, while the weak classifier $CF_2$ employs the difference in brightness values between coordinate positions P2a and P2b as the characteristic amount x.

Note that a case has been described in which each of the weak classifiers $CF_1$ through $CF_M$ extracts characteristic amounts x. Alternatively, the characteristic amounts x may be extracted in advance for a plurality of partial images PP, then input into each of the weak classifiers $CF_1$ through $CF_M$. Further, a case has been described in which brightness values are employed as the characteristic amounts x. Alternatively, data regarding contrast or edges may alternatively be employed as the characteristic amounts x.

Figure 5:
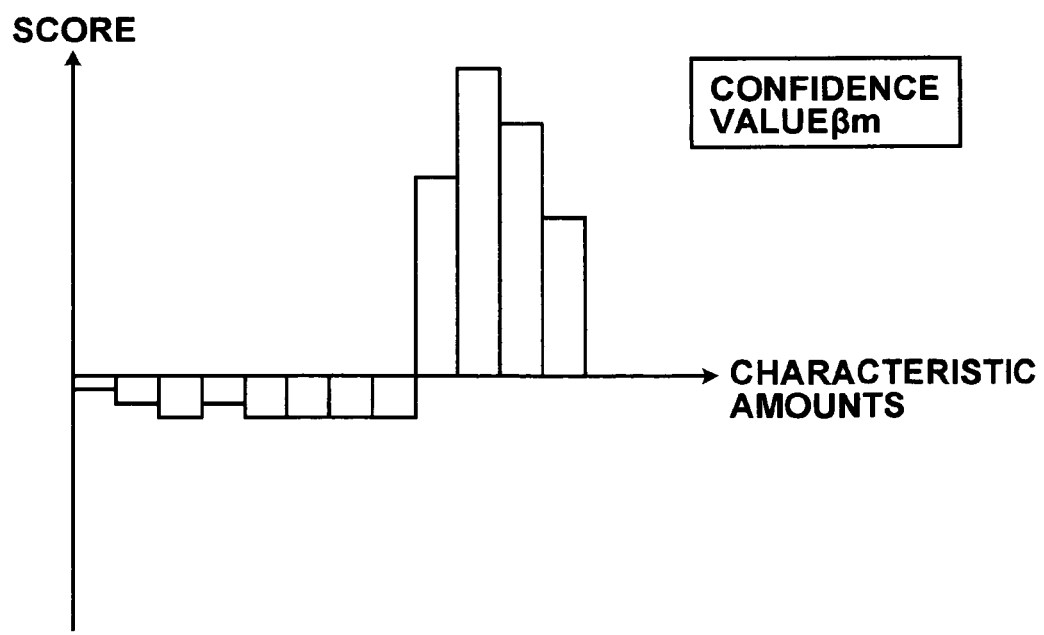
FIG. 5 is a graph that illustrates an example of a histogram of a weak classifier illustrated in FIG. 1.

Each of the weak classifiers $CF_1$ through $CF_M$ has a histogram such as that illustrated in FIG. 5. The weak classifiers $CF_1$ through $CF_M$ output scores f1(x) through fM(x) according to the values of the characteristic amounts x based on these histograms. Further, the weak classifiers $CF_1$ through $CF_M$ have confidence values $\beta_1$ through $\beta_M$ that represent the levels of discrimination performance thereof. The weak classifiers $CF_1$ through $CF_M$ calculate discrimination scores $\beta_M \cdot f_M(x)$ by multiplying the scores f1(x) through $f_M(x)$ by the confidence values $\beta_1$ through $\beta_M$. Whether the discrimination score $\beta_M \cdot f_M(x)$ of each weak classifier $CF_m$ is greater than or equal to a threshold value Sref is judged. A partial image PP is judged to represent a face when the discrimination score $\beta_M \cdot f_M(x)$ is equal to or greater than the threshold value Sref ($\beta_M \cdot f_M(x) \geq$ Sref).

The weak classifiers $CF_1$ through $CF_M$ of the profile face candidate classifying means 21 are configured in a cascade structure. Only partial images PP which have been judged to represent faces by all of the weak classifiers $CF_1$ through $CF_M$ are output as candidate images CP. That is, discrimination is performed by a downstream weak classifier $CF_{m+1}$ only on partial images in which faces have been discriminated by the weak classifier $CF_m$. Partial images PP in which faces have not been discriminated by the weak classifier $CF_m$ are not subjected to discrimination operations by the downstream weak classifier $CF_{m+1}$. The number of partial images PP to be discriminated by the downstream weak classifiers can be reduced by this structure, and accordingly, the discrimination operations can be accelerated.

Note that in the case described above, each of the discrimination scores $\beta_M \cdot f_M(x)$ are individually compared against the threshold value Sref to judge whether a partial image PP represents a face. Alternatively, discrimination may be performed by comparing the sum $\Sigma_{r=1}^{m} \beta_r \cdot f_r(x)$ of the discrimination scores of upstream weak classifiers $CF_1$ through $CF_{m-1}$ against a predetermined threshold value S1ref ($\Sigma_{r=1}^{m} \beta_r \cdot f_r(x) \geq$ S1ref). The discrimination accuracy can be improved by this method, because judgment can be performed while taking the discrimination scores of upstream weak classifiers into consideration.

Next, the profile face classifying means 22 will be described with reference to FIG. 1. The profile face classifying means 22 comprises: a 0° profile face classifier 22-1, for discriminating faces in which the direction that the face is facing within the image (angle) is 0°, that is, forward facing faces; a 30° profile face classifier 22-2, for discriminating faces in which the aforementioned angle is 30°; and profile face classifiers, for discriminating faces in which the aforementioned angle is within a range of −90° to +90°, in 30° increments. That is, the profile face classifying means 22 comprises a total of 7 classifiers 22-1 through 22-7. Note that for example, the 0° out-of-plane rotated face classifier 22-1 is capable of discriminating faces which are rotated within a range of −15° to +15° with the center of rotational angular range being 0°. Note that each of the plurality of profile face classifiers 22-1 through 22-7 comprises a plurality of weak classifiers which have performed learning by the boosting algorithm, similar to those of the profile face candidate classifying means 21 (refer to FIG. 3). The profile face classifying means 22 performs discrimination by the same discrimination method as that employed by the profile face candidate classifying means 21.

Next, the forward facing face detecting means 30 will be described. The forward facing face detecting means 30 detects partial images PP that represent forward facing faces from among the plurality of partial images PP. The forward facing face detecting means 30 comprises a forward facing face candidate classifying means 31, and a forward facing face classifying means 32. The forward facing face candidate classifying means 31 discriminates whether each of the plurality of partial images PP represent forward facing faces, and outputs partial images PP that possibly represent forward facing faces to the forward facing face classifying means 32, as candidate images CP. The forward facing face classifying means 32 discriminates whether each of the candidate images CP detected by the forward facing face candidate classifying means 31 and output thereto represent forward facing faces.

The forward facing face candidate classifying means 31 functions to perform binary discrimination regarding whether the partial images PP represent forward facing faces. The forward facing face classifying means 31 comprises a plurality of classifiers, each constituted by weak classifiers which have performed learning by the AdaBoosting algorithm, similar to the profile face candidate classifying means 21 (refer to FIG. 3).

The forward facing face classifying means 32 comprises: a 0° forward facing face classifier 32-1, for discriminating faces in which the angle formed by the center lines thereof and the vertical direction of the images that they are pictured in is 0°; a 30° forward facing face classifier 32-2, for discriminating faces in which the aforementioned angle is 30°; and in-plane rotated face classifiers 32-3 through 32-12, for discriminating faces in which the aforementioned angle is within a range of 30° to 330°, in 30° increments. Note that for example, the 0° in-plane rotated face classifier 32-1 is capable of discriminating faces which are rotated within a range of −15° (=345°) to +15° with the center of rotational angular range being 0°.

Note that each of the plurality of forward facing face classifiers 30-1 through 30-12 comprises a plurality of weak classifiers which have performed learning by the boosting algorithm, similar to those of the aforementioned profile face candidate classifying means 21 (refer to FIG. 3). The forward facing face classifying means 32 performs discrimination by the same discrimination method as that employed by the profile face candidate classifying means 21.

FIG. 6 is a flow chart that illustrates the operation of the face detecting apparatus 1. The operation of the face detecting apparatus 1 will be described with reference to FIGS. 1 through 6. First, the preliminary processing means 10 generates the multiple resolution images of the entire image P and normalizes the multiple resolution images (step ST1). Next, the partial image generating means 11 generates a plurality of partial images PP, by scanning the subwindow W within the entire image P at uniform scanning intervals (step ST2). Whether the generated partial images PP represent forward facing faces is judged by the profile face candidate classifying means 21 and the forward facing face candidate classifying means 31, and candidate images CP that possibly represent faces are detected (step ST3). Next, the candidate images CP are further discriminated by the profile face classifiers 22-1 through 22-7, and candidate images CP (=$SCP_{1-7}$) of faces in profile are detected. Meanwhile, the candidate images CP detected by the forward facing face candidate classifying means 31 are further discriminated by the forward facing face classifiers 32-1 through 32-12, and candidate images CP (=$SCP_{1-12}$) of forward facing faces are detected (step ST4).

IN order to improve the detection performance of the profile face candidate classifier 21 and the profile face classifier 22, it is desirable for the detection rate to be increased, the false positive detection rate to be decreased, and the processing speed to be increased. However, as illustrated in FIG. 7, these three evaluative criteria are correlated. If the detection rate is increased, the false positive detection rate increases, and the processing speed decreases. If the false positive detection rate is decreased, the number of partial images PP to be discriminated by downstream weak classifiers is reduced, and therefore the processing speed increases, but the detection rate decreases. Accordingly, it is difficult to improve all three criteria for evaluating detection performance simultaneously.

Therefore, the face detecting apparatus 1 enables prioritization of one of the evaluative criteria according to the purpose of detection of facial regions. To this end, the face detecting apparatus 1 comprises the detecting mode switching means 50, for switching to a detecting mode such that a desired criterion of detection performance is improved. The detecting mode switching means 50 functions to switch the detecting mode of the face detecting apparatus 1 to one of: a detection rate mode, in which the detection rates of the profile face detecting means 20 and the forward facing face detecting means 30 are increased; a false positive detection rate mode, in which the false positive detection rate is decreased; and a processing speed mode, in which the processing speed is increased. Note that a standard mode, in which the three evaluative criteria are balanced, is provided in addition to the three modes described above. The face detecting apparatus 1 is generally set in the standard mode. The switching among the aforementioned detecting modes is performed by a user via an input means, such as a keyboard and a mouse. The detecting mode switching means 50 switches the detecting mode of the face detecting apparatus 1 according to the selection of a detecting mode input via the input means.

Further, the parameter changing means 60 changes profile face detecting parameters and forward facing face detecting parameters according to the selected detecting mode, when the detecting mode is switched by the detecting mode switching means 50. Here, the profile face detecting parameter is the discrimination score threshold value Sref in either or both the profile face candidate classifying means 21 and the profile face classifying means 22. By changing the discrimination score threshold value Sref, the detecting mode switching means 50 configures the profile face detecting means 20 to focus on one of the detection rate, the false positive detection rate, and the processing speed. Similarly, the forward facing face detecting parameter is the discrimination score threshold value Sref in either or both the forward facing face candidate classifying means 31 and the forward facing face classifying means 32. By changing the discrimination score threshold value Sref, the parameter changing means 60 configures the forward facing face detecting means 30 to focus on one of the detection rate, the false positive detection rate, and the processing speed.

For example, in the case that the detecting mode switching means 50 switches the detecting mode to the detection rate mode, the discrimination score threshold values Sref of the profile face detecting means 20 and the forward facing face detecting means 30 are decreased, in order to improve the detection rates thereof. Thereby, it becomes easier for each of the weak classifiers to detect faces, and the detection rate increases as a result. In the case that the detecting mode switching means 50 switches the detecting mode to the false positive detection rate mode, the discrimination score threshold values Sref of the profile face detecting means 20 and the forward facing face detecting means 30 are increased. Thereby, only partial images PP having characteristic amounts more likely to be those that represent faces are detected as faces. As a result, the false positive detection rate decreases. In the case that the detecting mode switching means 50 switches the detecting mode to the processing speed mode, the discrimination score threshold values Sref of the profile face detecting means 20 and the forward facing face detecting means 30 are decreased, in order to accelerate the processing speeds thereof. Thereby, only partial images PP having characteristic amounts more likely to be those that represent faces are detected as faces by upstream weak classifiers. The number of partial images PP to be discriminated by downstream weak classifiers is reduced, and the processing speed increases as a result.

In this manner, by setting different profile face detecting parameters according to each detecting mode, the profile face detecting means 20 can be configured to focus on a desired aspect of detection performance according to the purpose of face detection. For example, in the case that skin color correction is to be administered based on signals of detected facial regions (partial images PP), it is desired for the false positive detection rate to be low. This is because inappropriate color correction would be administered if the skin color correction is administered on non-facial images which are detected as being facial regions. Accordingly, it is necessary to avoid false positive detections, even if the detection rate is decreased and the processing speed is increased. Therefore, in the case that the purpose of face detection is skin color correction, a user may select the false positive detection mode in order to perform appropriate skin color correction.

In the case that red eye correction is to be administered based on detected facial regions, it is desired for the detection rate to be high. This is because detection of red circular regions is further administered when performing red eye correction. Therefore, even if non-facial regions are detected during a face detecting process (that is, eve if the false positive detection rate is high), it is more preferable to not miss any facial regions. Accordingly, in the case that the purpose of face detection is red eye correction, a user may select the detection rate mode in order to perform appropriate red eye correction.

Further, in the case that processing time is desired to be shortened in order to display previews of face detection, it is desired for the processing speed to be high. Therefore, in this case, a user may select the processing speed mode to preview and verify the results of face detection.

According to the embodiment described above, the face detecting apparatus 1 comprises: the partial image generating means 11 for scanning the subwindow, which is a frame that surrounds a set number of pixels, over the entirety of the image P to generate the plurality of partial images PP; the forward facing face detecting means 30 for detecting partial images PP that include forward facing faces from among the plurality of partial images PP generated by the partial image generating means 11; the profile face detecting means 20 for detecting partial images PP that include faces in profile from among the plurality of partial images PP; the detecting mode switching means 50 for switching the detecting mode of the profile face detecting means 20 to one of: a detection rate mode, in which the detection rate is increased; a false positive detection rate mode, in which the false positive detection rate is decreased; and a processing speed mode, in which the processing speed is increased; and the parameter changing means 60, for changing profile face detecting parameters that determine the detection performance of the profile face detecting means 20 according to each of the detecting modes, and for changing forward facing face detecting parameters that determine the detection performance of the forward facing face detecting means 30. Therefore, detection performance can be improved in a cohesive, well balanced manner according to the purpose of face detection processes to be administered by the face detecting apparatus 1.

As illustrated in FIG. 3, the profile face detecting means 20 comprises the profile face classifiers 22-1 through 22-7 that employ a plurality of discrimination results obtained by the plurality of weak classifiers to perform final discrimination regarding whether the partial images PP represent faces in profile. Similarly, the forward facing face detecting means 30 comprises the forward facing face classifiers 32-1 through 32-12 that employ a plurality of discrimination results obtained by the plurality of weak classifiers to perform final discrimination regarding whether the partial images PP represent forward facing faces. The profile face detecting parameters and the forward facing face detecting parameters are discrimination score threshold values Sref of the plurality of weak classifiers of the profile face classifiers and the forward facing face classifiers when they discriminate whether the partial images PP represent faces in profile and forward facing faces. The parameter changing means 60 changes the discrimination score threshold values Sref according to each of the detecting modes. Therefore, switching among the detection modes is facilitated.

Further, as illustrated in FIG. 1, the profile face detecting means 20 comprises profile face candidate classifiers 21 that employ a plurality of discrimination results obtained by the plurality of weak classifiers to perform final discrimination regarding whether the partial images PP represent faces in profile, and output partial images PP that possibly represent faces in profile to the profile face classifiers 22-1 through 22-7. Similarly, the forward facing face detecting means 30 comprises forward facing face candidate classifiers 31 that employ a plurality of discrimination results obtained by the plurality of weak classifiers to perform final discrimination regarding whether the partial images PP represent forward facing faces, and output partial images PP that possibly represent forward facing faces to the forward facing face classifiers 32-1 through 32-12. The profile face detecting parameters and the forward facing face detecting parameters are discrimination score threshold values Sref of the plurality of weak classifiers of the profile face candidate classifiers 21 and the forward facing face candidate classifiers 31 when they discriminate whether the partial images PP represent faces in profile and forward facing faces, and the parameter changing means 60 changes the discrimination score threshold values Sref according to each of the detecting modes. Therefore, partial images PP that clearly do not represent faces in profile or forward facing faces, such as backgrounds and bodies, can be discriminated not to represent faces by the profile face candidate classifiers 21 or the forward facing face candidate classifiers 31. Thereby, discrimination by the profile face classifiers 22 or the forward facing face classifiers 32 is obviated. Accordingly, detecting operations can be expedited and processing time can be greatly reduced. At the same time, because the parameters of either or both the candidate classifiers 21, 31, and the classifiers 22, 32 can be changed, parameter settings can be finely adjusted according to the purpose of face detecting processes.

The plurality of weak classifiers are arranged in a cascade structure. Therefore, judgment is performed by downstream weak classifiers on partial images PP, which have been judged to represent faces in profile by an upstream weak classifier. Accordingly, the amount of processing to be performed by the downstream weak classifiers is greatly reduced, thereby expediting discrimination processes.

The present invention is not limited to the embodiment described above. For example, the parameter changing means 60 may change the profile face detecting parameters so as to improve the aspect of detection performance to be focused on, with the detection performance of the forward facing face detecting means 30 as a reference. The forward facing face detecting means 30 is superior to the profile face detecting means 20 from the viewpoints of detection rates, false positive detection rates, and processing speed. For this reason, it is necessary to employ classifiers constituted by greater numbers of weak classifiers and to perform a greater amount of calculations in cases that faces in profile are detected, compared to cases in which forward facing faces are detected. Therefore, by setting the parameters of the profile face detecting means 20 to perform detection processes at the same high performance level of the forward facing face detecting means 30 according to the desired aspect of detection performance, high detection performance can be provided as a whole. Note that the parameter changing means 60 may set the profile face detecting parameters to match the detection performance of the forward facing face detecting means 30 prior to changing of the forward facing face detecting parameters, or to match the detection performance of the forward facing face detecting means 30 following changing of the forward facing face detecting parameters.

What is claimed is:

1. A face detecting apparatus comprising:
partial image generating means for scanning a subwindow, which is a frame that surrounds a set number of pixels, over the entirety of an image to generate a plurality of partial images;
forward facing face detecting means for detecting partial images that include forward facing faces from among the plurality of partial images generated by the partial image generating means;

profile face detecting means for detecting partial images that include faces in profile from among the plurality of partial images;

detecting mode switching means for switching the detecting mode of the profile face detecting means to one of: a detection rate mode, in which the detection rate is increased; a false positive detection rate mode, in which the false positive detection rate is decreased; and a processing speed mode, in which the processing speed is increased; and parameter changing means, for changing profile face detecting parameters that determine the detection performance of the profile face detecting means according to each of the detecting modes, and for changing forward facing face detecting parameters that determine the detection performance of the forward facing face detecting means, wherein:

the profile face detecting means comprises profile face classifiers that employ a plurality of discrimination results obtained by a plurality of weak classifiers to perform final discrimination regarding whether the partial images represent faces in profile;

the forward facing face detecting means comprises forward facing face classifiers that employ a plurality of discrimination results obtained by a plurality of weak classifiers to perform final discrimination regarding whether the partial images represent forward facing faces;

the profile face detecting parameters and the forward facing face detecting parameters are threshold values for discrimination scores of the plurality of weak classifiers of the profile face classifiers and the forward facing face classifiers when they discriminate whether the partial images represent faces in profile and forward facing faces; and the parameter changing means changes the threshold values for the discrimination scores according to each of the detecting modes.

2. A face detecting apparatus as defined in claim 1, wherein:

the profile face detecting means comprises profile face candidate classifiers that employ a plurality of discrimination results obtained by a plurality of weak classifiers to perform final discrimination regarding whether the partial images represent faces in profile, and output partial images that possibly represent faces in profile to the profile face classifiers;

the forward facing face detecting means comprises forward facing face candidate classifiers that employ a plurality of discrimination results obtained by a plurality of weak classifiers to perform final discrimination regarding whether the partial images represent forward facing faces, and output partial images that possibly represent forward facing faces to the forward facing face classifiers;

the profile face detecting parameters and the forward facing face detecting parameters are threshold values for discrimination scores of the plurality of weak classifiers of the profile face candidate classifiers and the forward facing face candidate classifiers when they discriminate whether the partial images represent faces in profile and forward facing faces; and the parameter changing means changes the threshold values for the discrimination scores according to each of the detecting modes.

3. A face detecting apparatus as defined in claim 1, wherein:

the plurality of weak classifiers are arranged in a cascade structure; and judgment is performed by downstream weak classifiers on partial images, which have been judged to represent faces in profile by an upstream weak classifier.

4. A face detecting apparatus comprising:

partial image generating means for scanning a subwindow, which is a frame that surrounds a set number of pixels, over the entirety of an image to generate a plurality of partial images;

forward facing face detecting means for detecting partial images that include forward facing faces from among the plurality of partial images generated by the partial image generating means;

profile face detecting means for detecting partial images that include faces in profile from among the plurality of partial images;

detecting mode switching means for switching the detecting mode of the profile face detecting means to one of: a detection rate mode, in which the detection rate is increased; a false positive detection rate mode, in which the false positive detection rate is decreased; and a processing speed mode, in which the processing speed is increased; and parameter changing means, for changing profile face detecting parameters that determine the detection performance of the profile face detecting means according to each of the detecting modes, and for changing forward facing face detecting parameters that determine the detection performance of the forward facing face detecting means, wherein the parameter changing means:

changes the profile face detecting parameters such that the detection rates of the profile face detecting means and the forward facing face detecting means become substantially equal when the detecting mode is switched to the detection rate mode;

changes the profile face detecting parameters such that the false positive detection rates of the profile face detecting means and the forward facing face detecting means become substantially equal when the detecting mode is switched to the false positive detection rate mode; and changes the profile face detecting parameters such that the processing speeds of the profile face detecting means and the forward facing face detecting means become substantially equal when the detecting mode is switched to the processing speed mode.

5. A computer readable medium having recorded therein a program that causes a computer to function as:

partial image generating means for scanning a subwindow, which is a frame that surrounds a set number of pixels, over the entirety of an image to generate a plurality of partial images;

forward facing face detecting means for detecting partial images that include forward facing faces from among the plurality of partial images generated by the partial image generating means;

profile face detecting means for detecting partial images that include faces in profile from among the plurality of partial images;

detecting mode switching means for switching the detecting mode of the profile face detecting means to one of: a detection rate mode, in which the detection rate is increased; a false positive detection rate mode, in which the false positive detection rate is decreased; and a processing speed mode, in which the processing speed is increased; and parameter changing means, for changing profile face detecting parameters that determine the detection performance of the profile face detecting means according to each of the detecting modes, and for changing forward facing face detecting parameters that determine the detection performance of the forward facing face detecting means, wherein:

the profile face detecting means comprises profile face classifiers that employ a plurality of discrimination results obtained by a plurality of weak classifiers to perform final discrimination regarding whether the partial images represent faces in profile;

the forward facing face detecting means comprises forward facing face classifiers that employ a plurality of discrimination results obtained by a plurality of weak classifiers to perform final discrimination regarding whether the partial images represent forward facing faces;

the profile face detecting parameters and the forward facing face detecting parameters are threshold values for discrimination scores of the plurality of weak classifiers of the profile face classifiers and the forward facing face classifiers when they discriminate whether the partial images represent faces in profile and forward facing faces; and the parameter changing means changes the threshold values for the discrimination scores according to each of the detecting modes.

6. A computer readable medium as defined in claim 5, wherein:

the profile face detecting means comprises profile face candidate classifiers that employ a plurality of discrimination results obtained by a plurality of weak classifiers to perform final discrimination regarding whether the partial images represent faces in profile, and output partial images that possibly represent faces in profile to the profile face classifiers;

the forward facing face detecting means comprises forward facing face candidate classifiers that employ a plurality of discrimination results obtained by a plurality of weak classifiers to perform final discrimination regarding whether the partial images represent forward facing faces, and output partial images that possibly represent forward facing faces to the forward facing face classifiers;

the profile face detecting parameters and the forward facing face detecting parameters are threshold values for discrimination scores of the plurality of weak classifiers of the profile face candidate classifiers and the forward facing face candidate classifiers when they discriminate whether the partial images represent faces in profile and forward facing faces; and the parameter changing means changes the threshold values for the discrimination scores according to each of the detecting modes.

7. A computer readable medium as defined in claim 5, wherein:

the plurality of weak classifiers are arranged in a cascade structure; and judgment is performed by downstream weak classifiers on partial images, which have been judged to represent faces in profile by an upstream weak classifier.

8. A computer readable medium having recorded therein a program that causes a computer to function as:

partial image generating means for scanning a subwindow, which is a frame that surrounds a set number of pixels, over the entirety of an image to generate a plurality of partial images;

forward facing face detecting means for detecting partial images that include forward facing faces from among the plurality of partial images generated by the partial image generating means;

profile face detecting means for detecting partial images that include faces in profile from among the plurality of partial images;

detecting mode switching means for switching the detecting mode of the profile face detecting means to one of: a detection rate mode, in which the detection rate is increased; a false positive detection rate mode, in which the false positive detection rate is decreased; and a processing speed mode, in which the processing speed is increased; and parameter changing means, for changing profile face detecting parameters that determine the detection performance of the profile face detecting means according to each of the detecting modes, and for changing forward facing face detecting parameters that determine the detection performance of the forward facing face detecting means, wherein the parameter changing means:

changes the profile face detecting parameters such that the detection rates of the profile face detecting means and the forward facing face detecting means become substantially equal when the detecting mode is switched to the detection rate mode;

changes the profile face detecting parameters such that the false positive detection rates of the profile face detecting means and the forward facing face detecting means become substantially equal when the detecting mode is switched to the false positive detection rate mode; and changes the profile face detecting parameters such that the processing speeds of the profile face detecting means and the forward facing face detecting means become substantially equal when the detecting mode is switched to the processing speed mode.

\* \* \* \* \*